(12) United States Patent
Akatsu

(10) Patent No.: US 8,237,763 B2
(45) Date of Patent: Aug. 7, 2012

(54) LIGHT SOURCE APPARATUS, AND OPTICAL SCANNING APPARATUS AND IMAGE FORMING APPARATUS USING THE SAME

(75) Inventor: Kazuhiro Akatsu, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 694 days.

(21) Appl. No.: 12/474,511

(22) Filed: May 29, 2009

(65) Prior Publication Data

US 2009/0309952 A1 Dec. 17, 2009

(30) Foreign Application Priority Data

Jun. 13, 2008 (JP) .................................. 2008-154759
Jan. 6, 2009 (JP) .................................. 2009-001182

(51) Int. Cl.
*B41J 27/00* (2006.01)
(52) U.S. Cl. ........................................ 347/257; 347/261
(58) Field of Classification Search .................... 347/257
See application file for complete search history.

(56) References Cited

U.S. PATENT DOCUMENTS 4,815,059 A * 3/1989 Nakayama et al. ........ 369/44.24

FOREIGN PATENT DOCUMENTS

| JP | 1-28381 | 6/1989 |
|----|---------|--------|
| JP | 6-85233 | 10/1994 |
| JP | 2002-131677 | 5/2002 |
| JP | 2004-170771 | 6/2004 |
| JP | 2004-258565 | 9/2004 |
| JP | 2006-284653 | 10/2006 |
| JP | 2007-183414 | 7/2007 |
| JP | 2008-3198 | 1/2008 |
| JP | 2008-37047 | 2/2008 |

* cited by examiner

*Primary Examiner* — Uyen Chau N Le
*Assistant Examiner* — Kajli Prince
(74) *Attorney, Agent, or Firm* — Oblon, Spivak, McClelland, Maier & Neustadt, L.L.P.

(57) ABSTRACT

A disclosed light source apparatus includes a light source including multiple light emitting devices; an optical element configured to transmit light emitted from the light source; a tube configured to hold the optical element; and a tube holder configured to fix the tube by holding an end of the tube close to the light source or by holding the end of the tube on the light emission side away from the light source. A positional displacement preventing member is provided at the other end of the tube on a light emission side away from the light source in such a manner as to be slidable on the tube in the direction of an optical axis and prevent positional displacement of the tube in all directions perpendicular to the optical axis.

6 Claims, 9 Drawing Sheets

LIGHT SOURCE APPARATUS, AND OPTICAL SCANNING APPARATUS AND IMAGE FORMING APPARATUS USING THE SAME

BACKGROUND OF THE INVENTION

1. Field of the Invention

The present invention is directed to a light source apparatus used in an optical scanning apparatus which is mounted on an image forming apparatus, such as a digital copying machine or a laser printer, and in particular to a light source apparatus having multiple light emitting devices.

2. Description of the Related Art

It is conventionally known that changes in temperature of an optical scanning apparatus cause changes in wavelength of its light source, positional displacement due to expansion and contraction of optical components, and changes in the refractive index or the like, thereby causing a change in an image location (at which an image is formed), on a surface to be scanned, in the optical axis direction of the scanning light.

For example, Patent Document 1 proposes a technology that adjusts linear expansion coefficients of members supporting the light source and the collimator lens in such a manner that the distance between the light source and the collimator lens does not change, thereby preventing change in the image location, on the surface to be scanned, in the optical axis direction of the scanning light.

Patent Document 2 devises the lens structure of the collimator lens, whereby even if the wavelength of the light source changes, it is possible to prevent change in the image location, on the surface to be scanned, in the optical axis direction of the scanning light.

Patent Document 3 proposes to provide a ring-shaped member on the tube of the collimator lens in order to hermetically seal the space between the collimator lens and the light source. In this case, however, the collimator lens is fixed based on the position of the ring-shaped member, and therefore, the ring-shaped member does not shift in the optical axis direction even if the ambient temperature changes. Accordingly, the technology of Patent Document 3 leaves the problem that a change in wavelength of the light source due to environmental change causes change in the image location, on the surface to be scanned, in the optical axis direction of the scanning light.

If the tube of the collimator lens is made long, the position of the collimator lens can be shifted in relation to that of the ring-shaped member according to expansion and contraction of the tube. However, in this case, an end face of the tube away from the ring-shaped member is not fixed in the directions perpendicular to the optical axis, and therefore, the collimator lens may shift in a perpendicular direction. This sometimes causes the problem that the emitted light beam changes in a direction perpendicular to the optical axis.

Patent Document 5 proposes a technology that provides a spring means and a screw means in order to adjust the position of the collimator lens in the optical axis direction and further provides another spring means in the direction perpendicular to the optical axis. Accordingly, it is possible to prevent the positional displacement of the collimator lens in the perpendicular directions during the adjustment of the collimator lens in the optical axis direction. In this case, since the collimator lens is pressed in a unidirectional direction perpendicular to the optical axis under the force of the spring means, positional displacement in the pressing direction (e.g. the perpendicular direction) is prevented. However, there are gaps in the horizontal direction, and the position of the collimator lens may therefore be changed after the adjustment.

[Patent Document 1] Japanese Examined Patent Application Publication No. H01-28381
[Patent Document 2] Japanese Examined Patent Application Publication No. H06-85233
[Patent Document 3] Japanese Laid-open Patent Application Publication No. 2006-284653
[Patent Document 4] Japanese Laid-open Patent Application Publication No. 2004-170771
[Patent Document 5] Japanese Laid-open Patent Application Publication No. 2002-131677

As described above, there are conventionally proposed technologies that prevent change in the image location, on the surface to be scanned, in the optical axis direction of the scanning light caused by a change in temperature; however, not all the problems have been solved.

The structures of the light source apparatuses disclosed in Patent Documents 1 and 2 are directed to dealing with change in the image location, on the surface to be scanned, in the optical axis direction of the scanning light. Accordingly, neither Patent Document 1 nor Patent Document 2 takes into account a positional change in the directions perpendicular to the optical axis of the scanning light.

In the case of a synthesized light source apparatus that synthesizes two light sources, there are two scanning light beams, as described in Patent Document 4. Particularly in this case, change in the relative positional relationship in the directions perpendicular to the optical axis results in a change in the scan interval, thereby causing defects such as variation in the scanning pitch.

Even in the case where two light sources are not synthesized, if the scanning light is shifted in a direction perpendicular to the optical axis, it goes off from a position at which the optical sensor detects the printing start timing. This results in negative effects, such as inability to print due to misdetection or a decrease in light intensity due to deflection of the scanning light from the lens.

As in the case of Patent Document 5, even if positional displacement in one direction (e.g. the vertical direction) is prevented, the position of the collimator lens may be changed after adjustment since there are gaps in another direction (the horizontal direction), thereby causing the same negative effects as mentioned above. In particular, in the case of using expansion and contraction of the tube of the collimator lens in a proactive manner, as in embodiments of the present invention, the presence of gaps is undesirable since positional displacement is likely to occur.

One example of a light source having multiple light emitting devices is a surface emitting laser. In general, the collimator lens which renders parallel light emitted from the light source has larger aberration on the peripheral part compared to the central part. Large aberration tends to lead to a large beam spot. Therefore, in the case of using a surface emitting laser, the light emitting devices are disposed within the image circle (a region having an aberration of a predetermined value or less) of the collimator lens. FIG. 10 shows an example where nine light emitting devices are provided. A light source array region 70 and an image circle region 71 approximately coincide with each other and not much room is left between them. In this condition, if the position of the collimator lens is displaced in a direction perpendicular to the optical axis as described above, the image circle is displaced, whereby some light emitting devices on the periphery of the light source array region 70 undesirably go outside of the image circle.

It is expected that, in the future, a larger number of light emitting devices than in the case of FIG. 10 will be required and the light source array region therefore increases in size. In this case, a collimator lens having a large image circle is necessary. However, there is a limit to the size of the image circle, and the light source array region 70 and the image circle region 71 approximately coincide with each other and not much room is left between them, as illustrated in the example of FIG. 10. Therefore, in this case also, positional displacement of the collimator lens in a direction perpendicular to the optical axis causes positional displacement of the image circle. Accordingly some light source devices on the periphery of the light source array region 70 undesirably go outside of the image circle.

SUMMARY OF THE INVENTION

The present invention aims at providing a light source apparatus having less positional displacement in all directions perpendicular to the optical axis of the scanning light in the case where the light source apparatus has a structure in which the image location, on the surface to be scanned, in the optical axis direction of the scanning light is corrected using expansion and contraction of the supporting members of the light source and the collimator lens. The present invention also aims at providing a synthesized light source apparatus, an optical scanning apparatus and an image forming apparatus each having such a light source apparatus.

In order to solve the above problems, one aspect of the present invention is a light source apparatus including a light source including multiple light emitting devices; an optical element configured to transmit light emitted from the light source; a tube configured to hold the optical element; and a tube holder configured to fix the tube by holding an end of the tube close to the light source or by holding the end of the tube on the light emission side away from the light source. A positional displacement preventing member is provided at the other end of the tube on a light emission side away from the light source in such a manner as to be slidable on the tube in the direction of an optical axis and prevent positional displacement of the tube in all directions perpendicular to the optical axis.

Another aspect of the present invention is an optical scanning apparatus including a light source apparatus and a rotating polygon mirror. The light source apparatus includes a light source having multiple light emitting devices; an optical element configured to transmit light emitted from the light source; a tube configured to hold the optical element; a tube holder configured to fix the tube by holding an end of the tube close to the light source or by holding an end of the tube on a light emission side away from the light source; and a positional displacement preventing member provided at the other end of the tube on a light emission side away from the light source in such a manner as to be slidable on the tube in the direction of an optical axis. The light source apparatus is configured to prevent positional displacement of the tube in all directions perpendicular to the optical axis. The rotating polygon mirror is configured to deflect, for scanning, light beams emitted from the light source apparatus.

Yet another aspect of the present invention is an image forming apparatus including a photoconductor; a charging device configured to charge the photoconductor; an optical scanning apparatus configured to scan the surface of the photoconductor with light beams to form, on the photoconductor, an electrostatic latent image corresponding to image information to be recorded; a developing device configured to supply toner to the electrostatic latent image to form a toner image; a transfer device configured to transfer the toner image onto a recording medium; and a fixing device configured to fix the transferred toner image to the recording medium. The optical scanning apparatus includes a light source apparatus and a rotating polygon mirror. The light source apparatus includes a light source having multiple light emitting devices; an optical element configured to transmit light emitted from the light source; a tube configured to hold the optical element; a tube holder configured to fix the tube by holding an end of the tube close to the light source or by holding an end of the tube on a light emission side away from the light source; and a positional displacement preventing member provided at the other end of the tube on a light emission side away from the light source in such a manner as to be slidable on the tube in the direction of an optical axis. The light source apparatus is configured to prevent positional displacement of the tube in all directions perpendicular to the optical axis. The rotating polygon mirror is configured to deflect, for scanning, light beams emitted from the light source apparatus.

DETAILED DESCRIPTION OF THE PREFERRED EMBODIMENTS

Embodiments that describe the best mode for carrying out the present invention are explained next with reference to the drawings. The following descriptions are merely examples of the favorable embodiments of the present invention, and do not limit the scope of the present invention claimed in the appended claims.

a. First Embodiment

Figure 1:
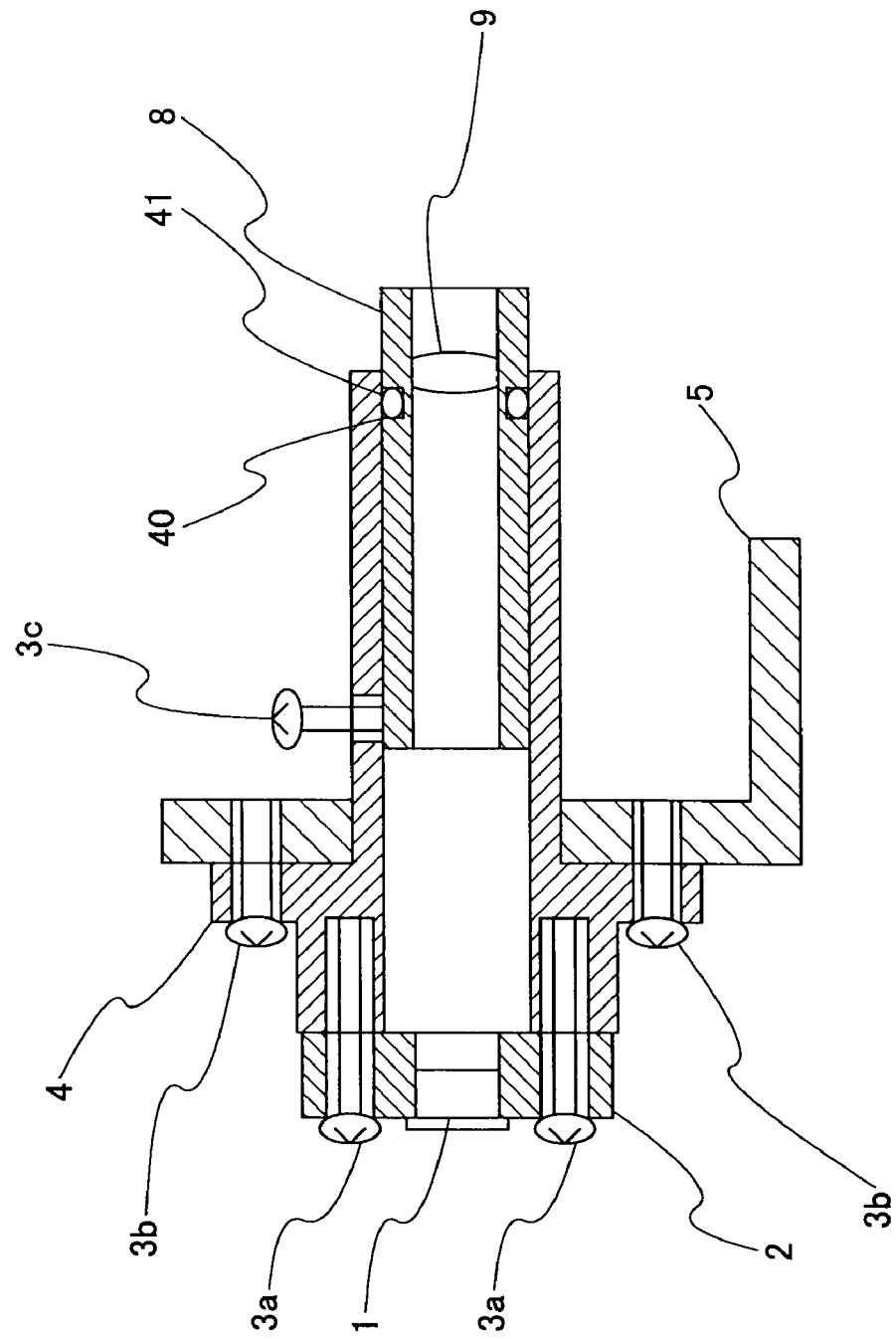
FIG. 1 is a cross-sectional view of a light source apparatus according to the first embodiment of the present invention.
Figure 2:
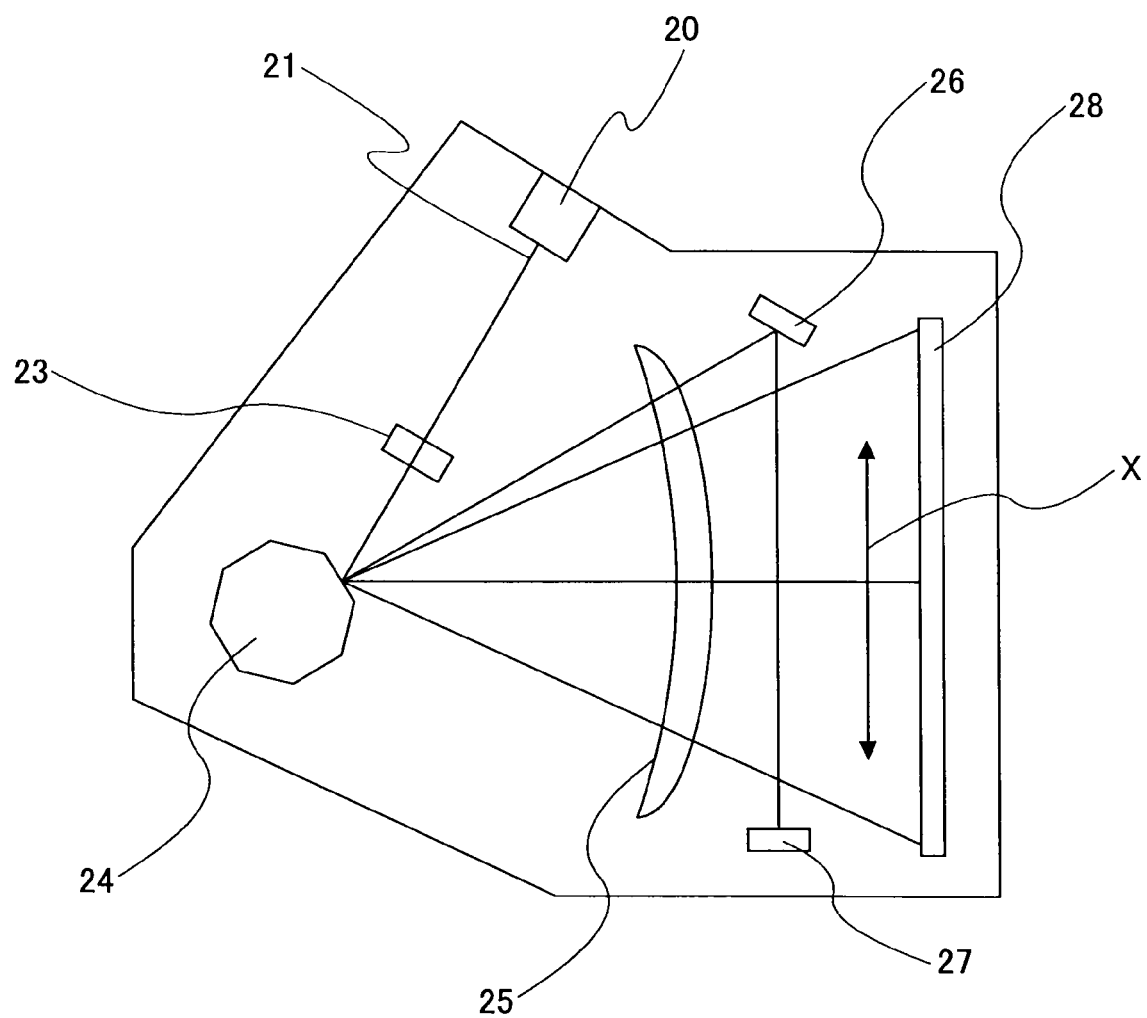
FIG. 2 is a schematic structural view of an optical scanning apparatus using the light source apparatus of FIG. 1.
Figure 3:
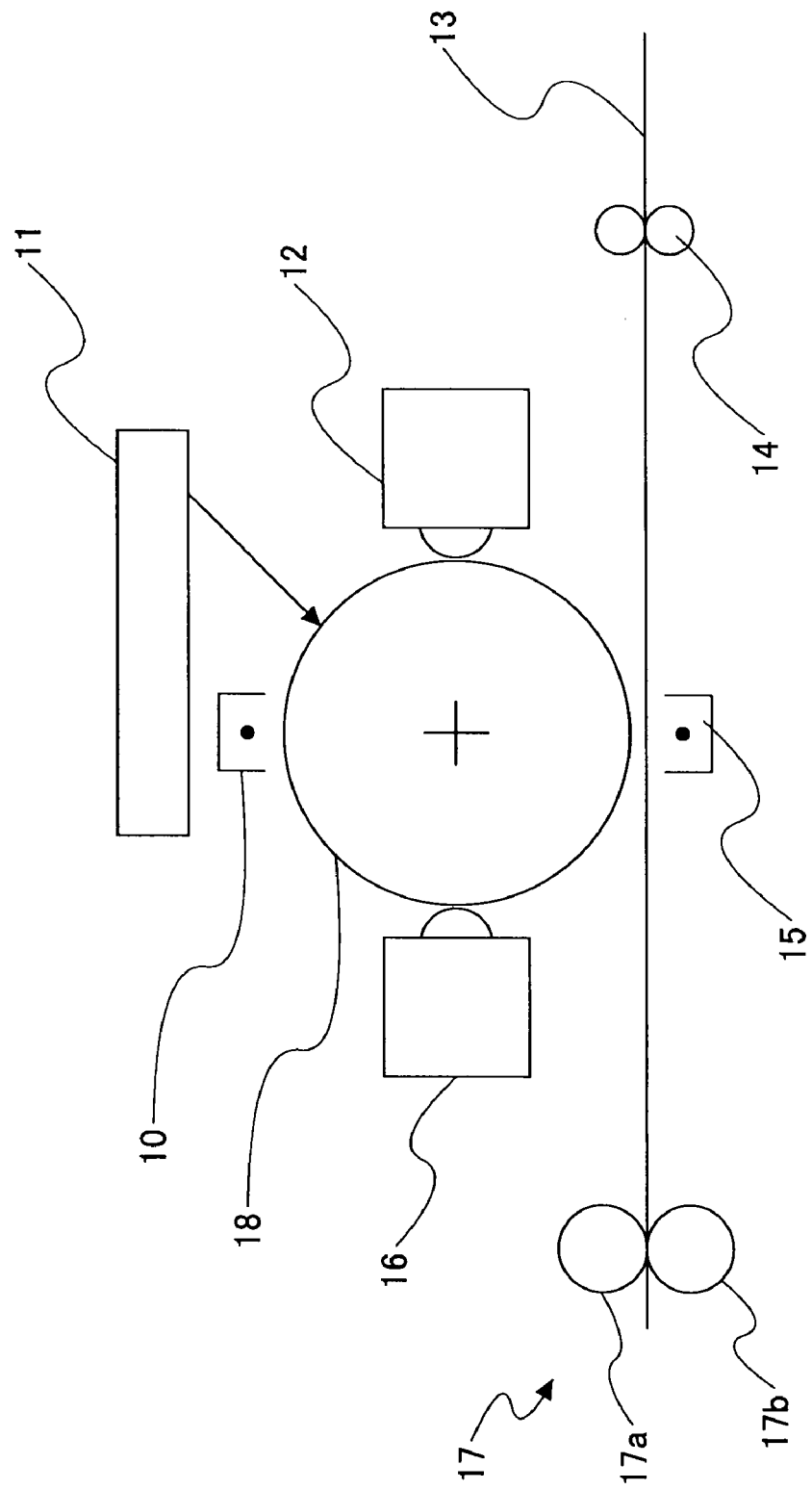
FIG. 3 is a schematic structural view of an image forming apparatus using the optical scanning apparatus of FIG. 2.
Figure 7:
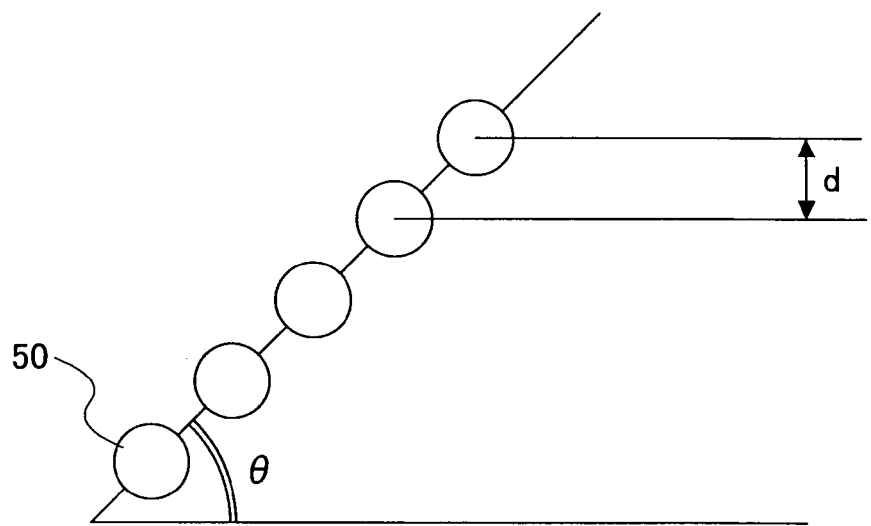
FIG. 7 shows spots formed on a photoconductor according to an embodiment of the present invention.
Figure 9:
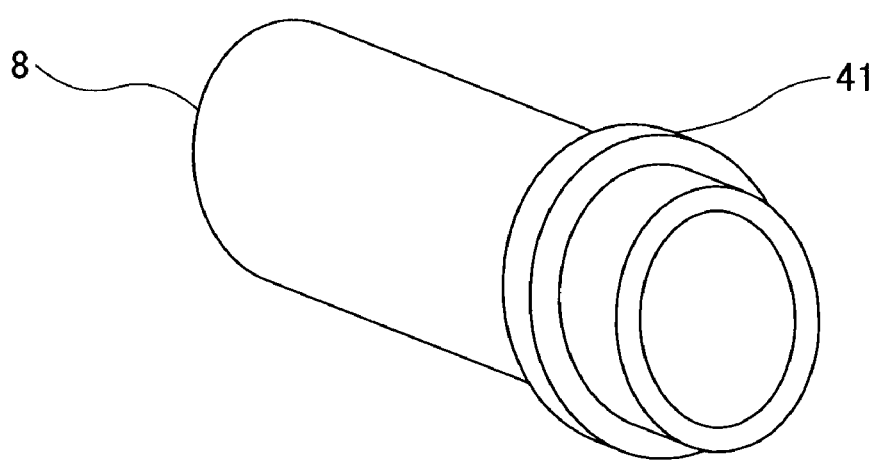
FIG. 9 shows the relationship between a tube and an O-ring according to the first embodiment of the present invention.

The first embodiment of the present invention is explained with reference to FIGS. 1, 2, 3, 7 and 9. FIG. 1 is a cross-sectional view of a light source apparatus according to the first embodiment of the present invention. FIG. 2 shows a schematic structure of an optical scanning apparatus using the light source apparatus. FIG. 3 shows a schematic structure of an image forming apparatus using the optical scanning apparatus. FIG. 7 shows spots formed on a photoconductor. FIG. 9 shows an O-ring 41 mounted on a tube 8. The O-ring 41 is mounted on the circumference of the tube 8, that is, surrounds the tube 8 360 degrees around the optical axis so as to prevent displacement of the tube 8 in all directions perpendicular to the optical axis.

First, the schematic structure of the image forming apparatus according to the present embodiment is described with reference to FIG. 3. A drum-shaped photoconductor 18 used for forming a toner image is rotated by a motor (not shown) at a constant circumferential velocity. The photoconductor 18 is uniformly charged with a particular polarity by a charging device 10, and then exposed to light emitted from an optical scanning apparatus 11, whereby an electrostatic latent image corresponding to image information to be recorded is formed on the photoconductor 18. A developing device 12 is provided downstream of the exposing location in the rotation direction of the photoconductor 18, and forms a toner image on the photoconductor 18.

A print sheet 13 which is a medium on which recording is performed is conveyed by a conveying device 14, such as paired conveying rollers. Subsequently, a transfer device 15 charges the backside of the print sheet 13 with a polarity opposite to that of the toner, thereby transferring to the print sheet 13 the toner image formed on the photoconductor 18. Toner remaining on the photoconductor 18 after the transfer is removed by a cleaning device 16. The print sheet 13 having the toner image transferred from the photoconductor 18 is conveyed to a fixing device 17. The fixing device 17 includes a heating roller 17a heated at a constant temperature and a pressing roller 17b abutting the heating roller 17a. Pressure is applied to the print sheet 13 carrying the toner image while passing through the fixing device 17, whereby the toner image is fused and fixed onto the print sheet 13. After the fixing process, the print sheet 13 is ejected and laid outside the image forming apparatus with other print sheets 13 in a stack.

FIG. 2 is a schematic diagram showing the internal structure of an optical scanning apparatus 11. A light beam 21 emitted from a light source apparatus 20 to be described below passes through a cylindrical lens 23 having a predetermined curvature only in the sub-scanning direction, and is deflected by a rotating polygon mirror 24 for scanning. Subsequently, the light beam 21 passes through an fθ lens 25, is then reflected by a folding mirror 28 and projected onto the photoconductor 18 to form an electrostatic latent image. The direction of arrow X in FIG. 2 represents the light scanning direction (main-scanning direction). A part of the beam deflected by the rotating polygon mirror 24 is directed to an optical sensor 27 by a mirror 26, and in response to this, the optical sensor 27 starts modulating the light beam 21 emitted from the light source apparatus 20.

Note that light emitting devices of a light source 1 are arranged in a line, and therefore, optical spots are formed on the photoconductor 18 in a line.

FIG. 7 shows five optical spots 50 aligned on the photoconductor 18. When the light source 1 is rotated around the optical axis, an alignment angle θ of the optical spots 50 on the photoconductor 18 is changed. In accordance with the change in the alignment angle θ, a scan interval d is also changed. Therefore, the scan interval d can be adjusted by changing the alignment angle θ.

FIG. 1 shows a cross-sectional view of the light source apparatus 20 according to the first embodiment of the present invention. The light source apparatus 20 mainly includes the light source 1, a light source holder 2, a collimator lens 9 which is an optical element mounted on the tube 8, and a tube holder 4. Note that FIG. 9 shows the O-ring 41 mounted on the tube 8.

The light source 1 is fixed to the light source holder 2 by welding or a screw (not shown). After the distance between the tube 8 and the light source 1 is adequately adjusted, a screw 3c is screwed in until the end of the screw 3c abuts the tube 8 and thereby fixes the tube 8 in place. Then, the positions of the light source holder 2 and the tube holder 4 in the directions perpendicular to the optical axis are determined, and the light source holder 2 and the tube holder 4 are subsequently joined into an integrated form with screws 3a. Then, the integrated light source holder 2 and tube holder 4 are fixed to a base 5 with screws 3b. At this point, the alignment angle θ of the spots on the photoconductor 18 is changed by positioning the light source 1 in the rotation direction around the optical axis so that the scan interval d can be appropriately adjusted.

According to the present embodiment, an end of the tube 8 close to the light source 1 is fixed with the screw 3c. A groove 40 is provided at the other end of the tube on the light emission side, and the O-ring 41 which is a ring-shaped elastic body is placed in the groove 40. The O-ring 41 is designed in such a manner as to be movable, inside the tube holder 4, in the optical axis direction but not in the direction perpendicular to the optical axis. Accordingly, the O-ring 41 does not apply constraints on positional displacement of the end of the tube not fixed with the screw 3c (i.e. the end on the light emission side) in the optical axis direction, which positional displacement is caused by expansion and contraction of the tube 8; however, it is able to apply constraints on positional displacement in all directions perpendicular to the optical axis. Providing the O-ring 41 close to the collimator lens 9 further improves the effect of the O-ring 41 for preventing the positional displacement.

In addition, since being reasonable in price, the O-ring 41 creates only a modest increase in price of the light source apparatus. Note that in the present embodiment, the groove 40 and the O-ring 41 are provided on the tube 8; however, the same effect may be achieved by providing a similar structure on the tube holder 4.

Next is described focal point displacement of the spots formed on the photoconductor 18, associated with expansion and contraction of the tube 8. Assume here the scanning optical apparatus as a whole having the following characteristic: if the ambient temperature changes by +30 K, the position of the focal point of each optical spot 50 on the photoconductor 18 is displaced by 10 mm to the rear side of the photoconductor in the optical axis direction. If the longitudinal magnification of the optical scanning apparatus is 100, the displacement is equivalent to 0.1 mm when converted into positional displacement in the optical axis direction of the light source 1. In the case where the holders have a linear expansion coefficient of $23 \times 10^{-6}$ (the linear expansion coefficient of aluminum), the tube has a linear expansion coefficient of $90 \times 10^{-6}$ (that of Delrin), the distance between the light source 1 and the fixing point of the screw 3c is 30 mm, and the distance between the fixing point of the screw 3c and the collimator lens 9 is 30 mm, the distance between the light source 1 and the collimator lens 9 is changed (increased) by 0.1 mm with a temperature change of 30 K. Accordingly, by using the light source unit having the above-described structure, it is possible to offset, with the optical scanning apparatus as a whole, the optical-axis-direction displacement of the focal point of each optical spot formed on the photoconductor 18 caused due to a change in the ambient temperature.

b. Second Embodiment

Figure 4:
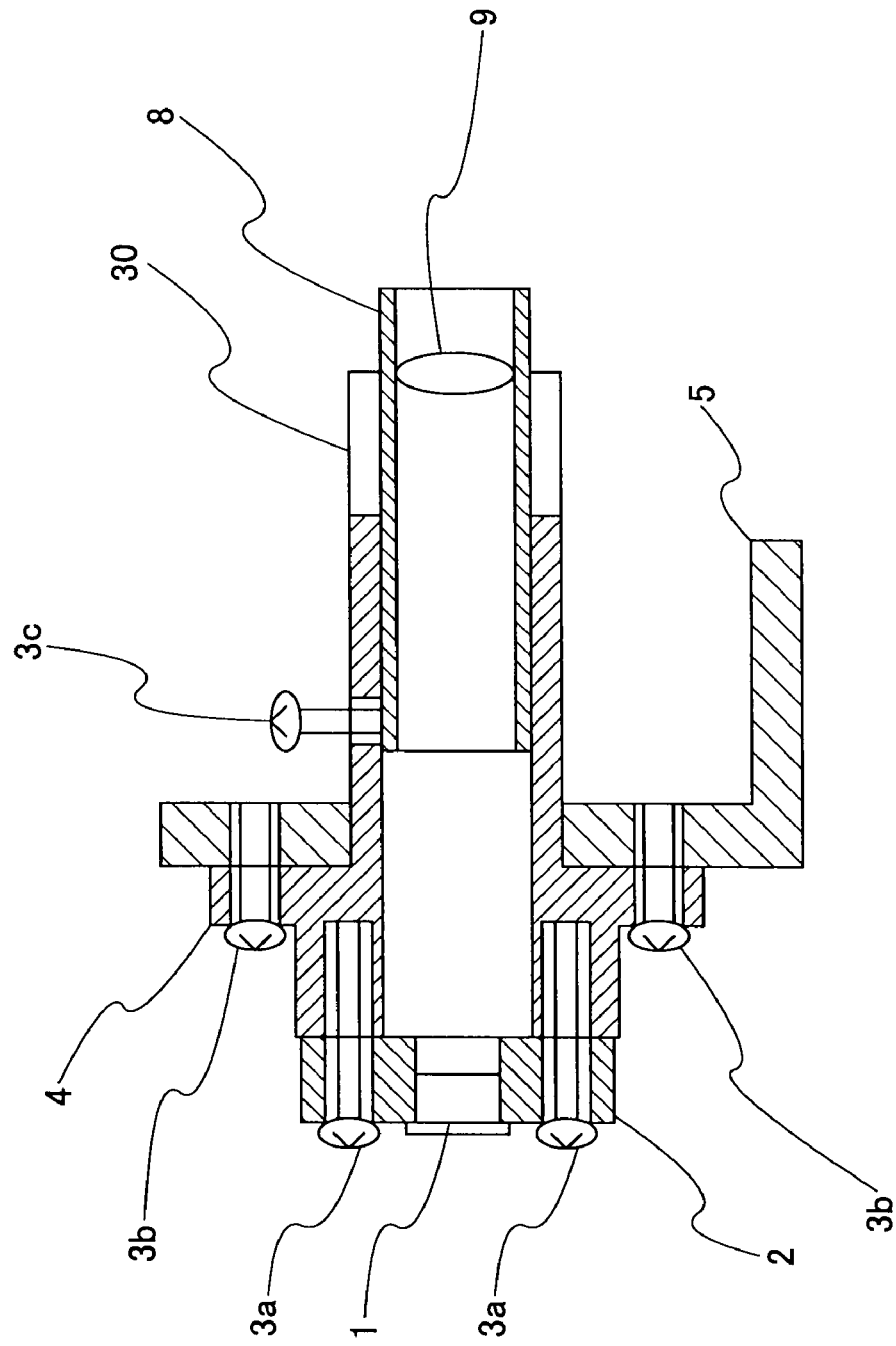
FIG. 4 is a cross-sectional view of a light source apparatus according to the second embodiment of the present invention.

FIG. 4 is a cross-sectional view of a light source apparatus according to the second embodiment. An optical scanning apparatus and an image forming apparatus of the present embodiment are the same as those according to the first embodiment. In addition, their assembly and adjustment method are also the same as in the first embodiment.

According to the present embodiment, the end of the tube 8 close to the light source 1 is fixed with the screw 3c, and a direct drive bearing 30, which is a ring bearing, is provided on the other end. Accordingly, constraint is not applied to the movement of the tube 8 in the optical axis direction; however, constraint is applied to the movement of the tube 8 in all directions perpendicular to the optical axis. Therefore, in the case where the collimator lens 9 is desired to be shifted in the optical axis direction by causing the tube 8 to expand/contract with reference to the position of the screw 3c, using a change in the ambient temperature, positional displacement of the other end (the end on the light emission side) can be prevented in all directions perpendicular to the optical axis.

c. Third Embodiment

Figure 5:
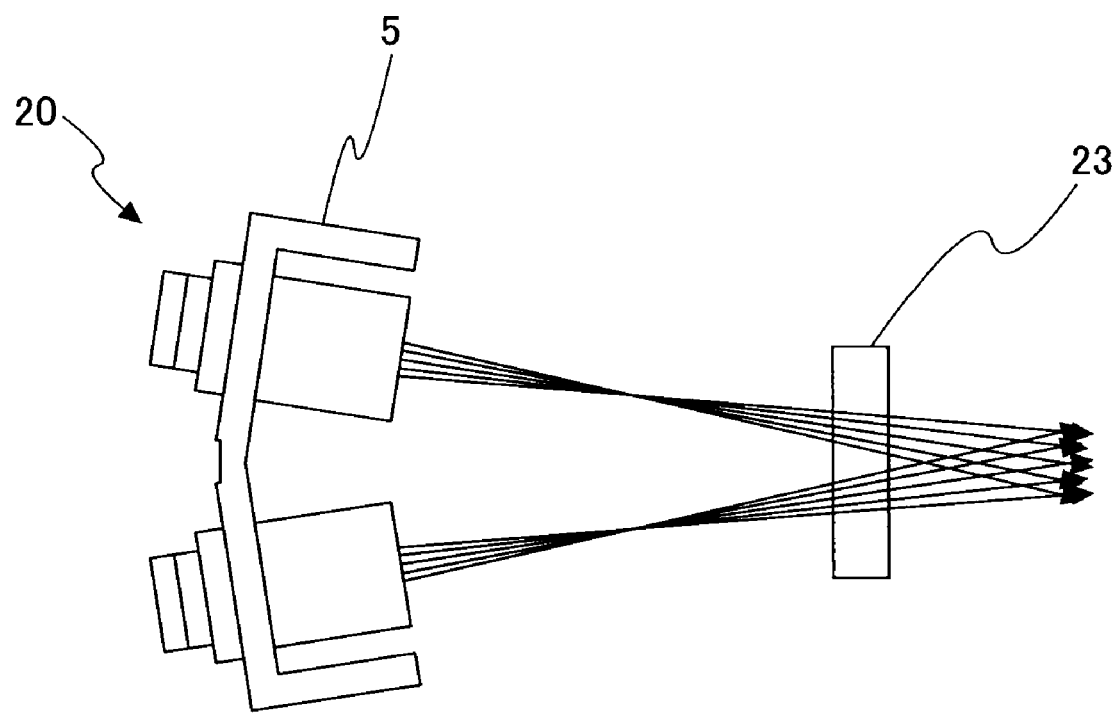
FIG. 5 is a structural diagram of a synthesized light source apparatus according to the third embodiment of the present invention.

FIG. 5 illustrates the third embodiment and shows an example of a synthesized light source having two light source apparatuses. In FIG. 5, two sets of the light source apparatuses 20 (first and second light sources) according to the above embodiments are mounted on the base 5.

The two light source apparatuses 20 are mounted in such a manner that light beams emitted from the two light source apparatuses 20 at an angle with each other go through the cylindrical lens 23 and substantially intersect with each other at the rotating polygon mirror 24 (see FIG. 2). According to the structure, a synthesized light source is achieved with a small number of components, and therefore, it is possible to provide a light source having twice the number of beams of a single light source at a moderate price.

d. Fourth Embodiment

Figure 6:
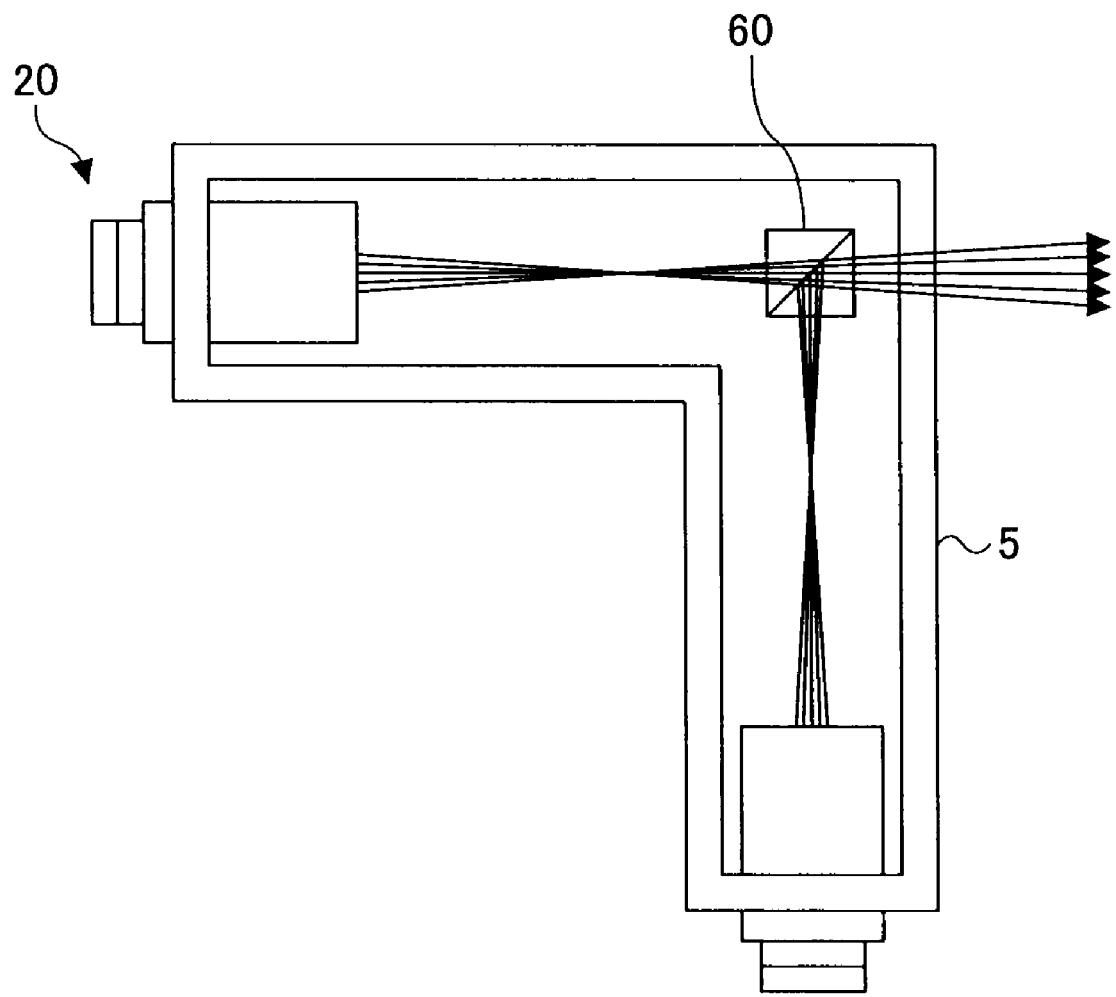
FIG. 6 is a structural diagram of a synthesized light source apparatus according to the fourth embodiment of the present invention.

FIG. 6 illustrates the fourth embodiment in which two sets of the light source apparatuses 20 (first and second light sources) are fixed to the base 5, and a reflected beam and a transmitted beam are synthesized by a prism 60. In this case, the optical axis of the light beam emitted from each light source apparatus 20 can be made to coincide with the optical axis of the synthesized light beam. Accordingly, it is possible to achieve an optical system having small aberration, thereby obtaining a stable and small spot diameter.

Figure 8:
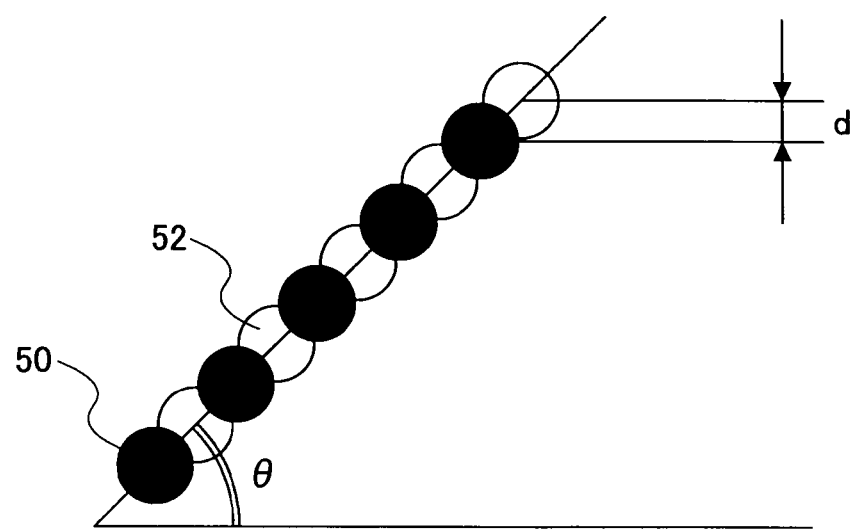
FIG. 8 shows spots formed on a photoconductor according to another embodiment of the present invention.

FIG. 8 shows an example of spot alignment formed on the photoconductor 18 in the case of synthesizing two light sources as in the case of the third and fourth embodiments. As shown in FIG. 8, a spot 50 of the first light source and a spot 52 of the second light source are alternately aligned in a single line. For example, in the case where scanning is performed at 1200 dpi, the scan interval d is set to 0.021 mm by changing the spot alignment angle θ. With a synthesized light source, variation in the scanning pitch or the like is generally unnoticeable if the positional displacement of the optical spots of the two light sources is kept within ½ of the scan interval d. Accordingly, in the case of 1200 dpi, the positional displacement should be 0.011 mm or less.

In the case where the lateral magnification of the scanning optical apparatus as a whole is 10, the positional displacement of the light source in the direction perpendicular to the optical axis is amplified tenfold on the photoconductor 18. Therefore, it is necessary to keep the positional displacement of the light source unit within 0.0011 mm.

According to the embodiments of the present invention, the focal point displacement can be corrected by making a smooth shift of the collimator lens 9 in the optical axis direction. In addition, the positional displacement in all directions perpendicular to the optical axis is rarely seen and can be kept within 0.0011 mm. Therefore, it is possible to perform printing with unnoticeable variation in the scanning pitch even if the ambient temperature changes.

Figure 10:
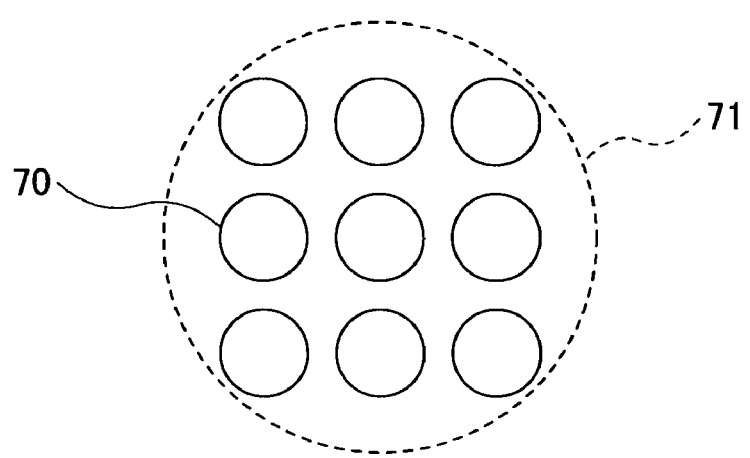
FIG. 10 shows the relationship between a device arrangement of a surface emitting laser and an image circle.

In the first through fourth embodiments, multiple light sources aligned in a single row are described as an example; however, the same effect can be obtained using a surface emitting laser in which light source devices are arranged as shown in FIG. 10. The spot arrangement on the photoconductor 18 in the synthesis process is different, and is therefore described below in the fifth and six embodiments.

e. Fifth Embodiment

Figure 11:
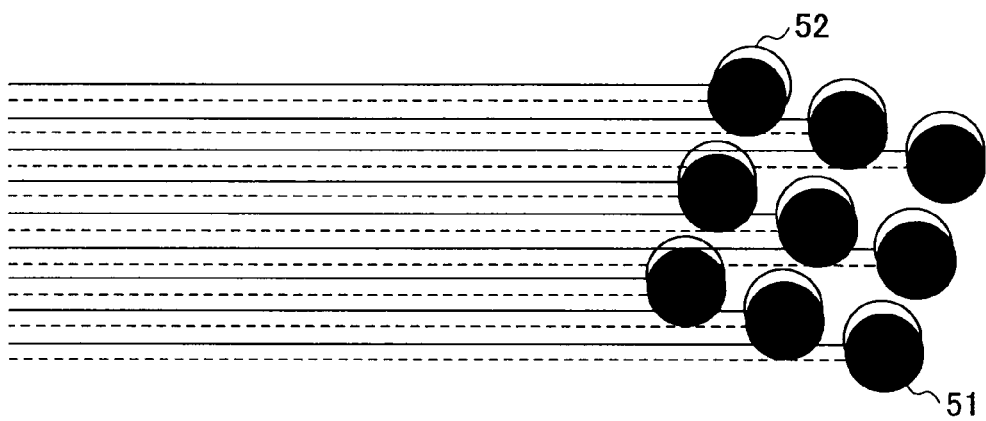
FIG. 11 shows a spot alignment obtained by synthesizing light of surface emitting lasers.

The structure of the synthesized light source is the same as that in the third or fourth embodiment. FIG. 11 shows spots formed on the photoconductor. The optical spots 52 of the second light source are located among the optical spots 51 of the first light source. In this case, if the positional displacement of the optical spots of the two light sources is kept within ½ of the scan interval d, variation in the scanning pitch or the like is unnoticeable. Accordingly, in the case of 1200 dpi, the positional displacement should be 0.011 mm or less. In the case where the lateral magnification of the scanning optical apparatus as a whole is 10, the positional displacement of the light source in the direction perpendicular to the optical axis is amplified tenfold on the photoconductor 18. Therefore, it is necessary to keep the positional displacement of the light source unit within 0.0011 mm. According to the embodiments of the present invention, the focal point displacement can be corrected by making a smooth shift of the collimator lens 9 in the optical axis direction. In addition, the positional displacement in all directions perpendicular to the optical axis is rarely seen and can be kept within 0.0011 mm. Therefore, it is possible to perform printing with unnoticeable variation in the scanning pitch even if the ambient temperature changes. Furthermore, since the displacement of the image circle is small, light emitting devices on the periphery do not have increased spot diameters.

f. Sixth Embodiment

Figure 12:
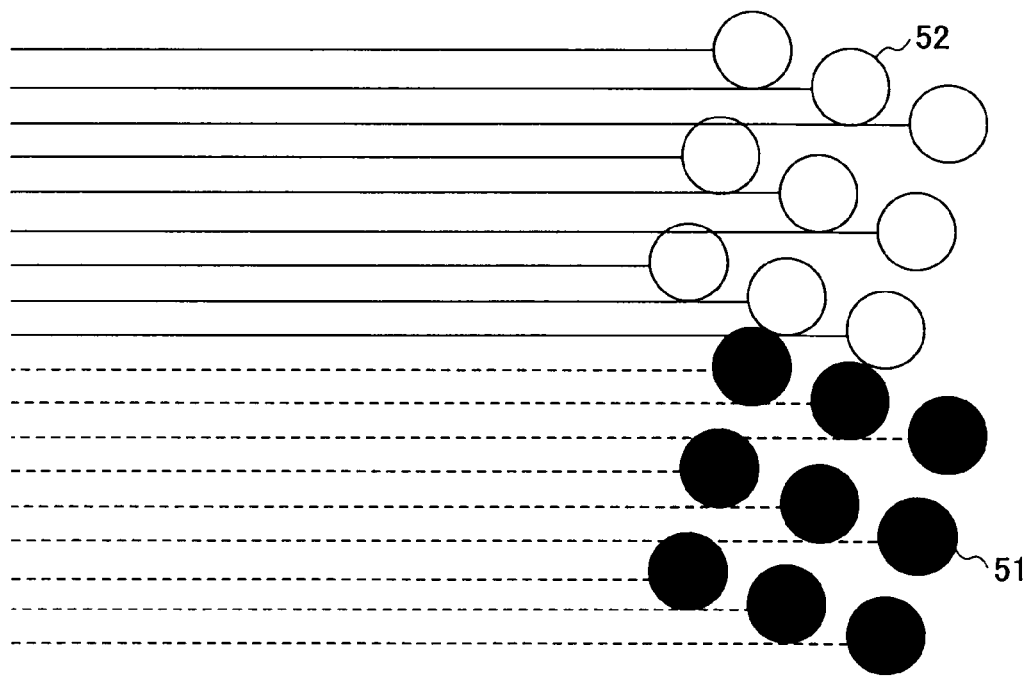
FIG. 12 shows another spot alignment obtained by synthesizing light of surface emitting lasers.

The structure of the synthesized light source is the same as that in the third or fourth embodiment. FIG. 12 shows spots formed on the photoconductor. A set of the optical spots 51 of the first light source and a set of the optical spots 52 of the second light source are arranged side by side. In this case also, if the positional displacement of the optical spots of the two light sources is kept within ½ of the scan interval d, variation in the scanning pitch or the like is unnoticeable. Accordingly, in the case of 1200 dpi, the positional displacement should be 0.011 mm or less. In the case where the lateral magnification of the scanning optical apparatus as a whole is 10, the positional displacement of the light source in the direction perpendicular to the optical axis is amplified tenfold on the photoconductor 18. Therefore, it is necessary to keep the positional displacement of the light source unit within 0.0011 mm. According to the embodiment of the present invention, the focal point displacement can be corrected by making a smooth shift of the collimator lens 9 in the optical axis direction. In addition, the positional displacement in all directions perpendicular to the optical axis is rarely seen and can be kept within 0.0011 mm. Therefore, it is possible to perform printing with unnoticeable variation in the scanning pitch even if the ambient temperature changes. Furthermore, since the displacement of the image circle is small, light emitting devices on the periphery do not have increased spot diameters.

In the above embodiment, the screw 3c for fixing the tube 8 is provided at the end of the tube 8 close to the light source 1. However, in the case of a scanning light apparatus exhibiting a characteristic opposite to the above in terms of the focal point displacement in the optical axis direction caused by a change in the ambient temperature (i.e. the focal point is displaced toward to photoconductor when the temperature increases), the screw 3c may be provided at the other end of the tube 9 farther away from the light source 1.

In summary, the present invention is capable of providing a light source apparatus having less positional displacement in all directions perpendicular to the optical axis of the scanning light in the case where the light source apparatus has a structure in which the image location, on the surface to be scanned, in the optical axis direction of the scanning light is designed not to change, using the combination of the linear expansion coefficients of the supporting members of the light source and the collimator lens. Also, the present invention is capable of providing a synthesized light source apparatus, an optical scanning apparatus and an image forming apparatus each having such a light source apparatus.

This application is based on Japanese Patent Applications No. 2008-154759 filed on Jun. 13, 2008 and No. 2009-001182 filed on Jan. 6, 2009, the contents of which are hereby incorporated herein by reference.

What is claimed is:

1. A light source apparatus comprising:
   a light source including a plurality of light emitting devices;
   an optical element configured to transmit light emitted from the light source;
   a tube configured to hold the optical element; and
   a tube holder configured to fix the tube by holding an end of the tube close to the light source or by holding the end of the tube on a light emission side away from the light source;
   wherein a positional displacement preventing member is provided at the other end of the tube on a light emission side away from the light source in such a manner as to be slidable on the tube in a direction of an optical axis and prevent positional displacement of the tube in all directions perpendicular to the optical axis.

2. The light source apparatus as claimed in claim 1, wherein the positional displacement preventing member is a ring-shaped elastic body.

3. The light source apparatus as claimed in claim 1, wherein the positional displacement preventing member is a bearing-type object.

4. The light source apparatus as claimed in claim 1, wherein the light source apparatus is a synthesized light source apparatus for emitting synthetic light created by synthesizing light beams.

5. An optical scanning apparatus comprising:
   a light source apparatus including a light source including a plurality of light emitting devices; an optical element configured to transmit light emitted from the light source; a tube configured to hold the optical element; a tube holder configured to fix the tube by holding an end of the tube close to the light source or by holding an end of the tube on a light emission side away from the light source; and a positional displacement preventing member provided at the other end of the tube on a light emission side away from the light source in such a manner as to be slidable on the tube in a direction of an optical axis and configured to prevent positional displacement of the tube in all directions perpendicular to the optical axis; and
   a rotating polygon mirror configured to deflect, for scanning, light beams emitted from the light source apparatus.

6. An image forming apparatus comprising:
   a photoconductor;
   a charging device configured to charge the photoconductor;
   an optical scanning apparatus configured to scan a surface of the photoconductor with light beams to form, on the photoconductor, an electrostatic latent image corresponding to image information to be recorded, and including a light source apparatus and a rotating polygon mirror, the light source apparatus including a light source including a plurality of light emitting devices; an optical element configured to transmit light emitted from the light source; a tube configured to hold the optical element; a tube holder configured to fix the tube by holding an end of the tube close to the light source or by holding an end of the tube on a light emission side away from the light source; and a positional displacement preventing member provided at the other end of the tube on a light emission side away from the light source in such a manner as to be slidable on the tube in a direction of an optical axis and configured to prevent positional displacement of the tube in all directions perpendicular to the optical axis, the rotating polygon mirror being configured to deflect, for scanning, light beams emitted from the light source apparatus;
   a developing device configured to supply toner to the electrostatic latent image to form a toner image;
   a transfer device configured to transfer the toner image onto a recording medium; and
   a fixing device configured to fix the transferred toner image to the recording medium.

* * * * *